United States Patent
Hite et al.

(10) Patent No.: US 7,982,862 B2
(45) Date of Patent: Jul. 19, 2011

(54) LINE OF SIGHT WIND SPEED DETECTION SYSTEM

(76) Inventors: Brandon Hite, Albuquerque, NM (US); John Taylor, Colorado Springs, CO (US)

( * ) Notice: Subject to any disclaimer, the term of this patent is extended or adjusted under 35 U.S.C. 154(b) by 302 days.

(21) Appl. No.: 12/313,941

(22) Filed: Nov. 26, 2008

(65) Prior Publication Data

US 2010/0128250 A1  May 27, 2010

(51) Int. Cl.
  *G01P 3/36* (2006.01)
(52) U.S. Cl. .......................................... 356/28; 356/337
(58) Field of Classification Search .................... 356/28, 356/28.5, 337, 342
  See application file for complete search history.

(56) References Cited

U.S. PATENT DOCUMENTS

| | | | |
|---|---|---|---|
| 4,182,570 A | 1/1980 | Courrier et al. | |
| 6,847,437 B2 | 1/2005 | Bruel et al. | |
| 7,405,834 B1 * | 7/2008 | Marron et al. | 356/521 |
| 7,532,311 B2 * | 5/2009 | Henderson et al. | 356/4.01 |
| 7,705,971 B2 * | 4/2010 | Crowe | 356/28 |

OTHER PUBLICATIONS

Quadrant Tracking Detector /Processor; website (www.analogmodules.com); Longwood, Florida; Feb. 2007.
Hartmann Wavefront Analyzer Tutorial; article; 2004; Part No. 10885-001, Rev. D.
S.C.West, S. Callahan and D. Fisher; An Interferometric Hartmann Wavefront Anaylzer for the 6.5m MMT, and . . . ; MMTO Technical Report #37; Jun. 2001.
Marc Sarazin, et al.; The Tololo SLODAR Campaign; Final Report; Feb. 6, 2005.
Field Artillery Meteorology System; website (http://www.aselsan.com.tr/urun.asp?urun_id=93&lang=en).
Generalized Scidar at UNAM; website (http://www.astrosmo.unam.mx/~r.avila/Scidar?ScidarCarat.html).
Windographer—Wind Data Analysis Program; website (http://www.mistaya.ca/products/windographer.htm).
SAO/NASA ADS Physics Abstract Service; website (http://adsabs.harvard.edu/abs/2007SPIE.6687E..33S).
Horizontoal Turbulence Measurements using SLODAR; CAT.INIST; website: (http://cat.inist.fr/?aModele=afficheN&cpsidt=17833495); 2007.
Turbulence profiling using extended objects for Slope Detection and Ranging (SLODAR); website (http://cat.inist.fr/?aModele=afficheN&cpsidt=18524842); 2007.
Detecting Turbulence Mathematician Calms the Skies With Turbulence Detection Algorithm; website(http://sciencedaily.com/videos/2008/0102-detecting_turbulence.htm);ScienceDaily.
Anemometers, Ultrasonic Anemometers, Wind Speed and Direction Sensors; website (http://www.gill.co.uk/products/anemometer/anemometer.htm).

(Continued)

*Primary Examiner* — Isam Alsomiri
(74) *Attorney, Agent, or Firm* — Dale B Halling

(57) ABSTRACT

The invention is a line of sight wind detection system that has a laser with an output that is directed at a target. The system also has a receiver with a Hartmann aperture array receiving a reflected beam impinging on the Hartmann aperture array. A multiple pixel sensor senses a number of spots of light from the Hartmann aperture array. An analyzer receives an output from the multiple pixel sensor and determines an effective wind speed along a line of sight using a position of the spots. The system takes advantage of the fact that the wind along the line of sight will result in a shift in the angle of the wave front of the reflected beam. This shift in the angle of the wave front contains all the information of the cumulative effect on a projectile fired at the target.

6 Claims, 2 Drawing Sheets

OTHER PUBLICATIONS

Satellite Active Sensing; website (http://www.metoffice.gov.uk/research/nwp/satellite/active/index.htm).

Scintillometer; website (http://en.wikipedia.org/wiki/Scintillometer).

Moshe Ben-Ezra, Assaf Zomet, and Shree K. Nayar; Jitter-Camera: High Resolution Video from a Low Resolution Detector; paper; Columbia University, New York, NY.

R.W. Wilson; SLODAR: measuring optical turbulence altitude with a Shack-Hartmann wavefront sensor; paper; Univ. of Durham UK; Jul. 10, 2002.

Richard W. Wilson, Christopher D. Saunter; Turbulence profiler and seeing monitor for laser guide star adaptive optics; paper; University of Durham, UK.

Lianqi Wang, et al.; Atmospheric turbulence profiling with SLODAR using multiple adaptive optics wavefront sensors; article; Applied Optics/vol. 47, No. 11; pub. Apr. 4, 2008.

Wilson, et al.; Development of a Portable SLODAR Turbulence Profiler; article; Spie Use, V. 2 54490-74 (p. 1 of 8); May 27, 2004.

Richard W. Wilson and Christpher D. Saunter; Turbulence profiler and seeing monitor for laser guide star adaptive optics; paper; University of Durham, UK.

* cited by examiner

LINE OF SIGHT WIND SPEED DETECTION SYSTEM

BACKGROUND OF THE INVENTION

Determining the effect of wind on a projectile in flight is important to accurately placing a projectile on a target. The most common method of estimating the effect of the wind for target shooters is with the use of flags along a shooting range. Trained military snipers use external cues such as the bending of grass, the leaves moving in a tree etc. to estimate wind characteristics. Handheld windmeters are used to determine wind direction and speed at the bore of a rifle. However, the big limitation with handheld windmeters is that they only provide information about the current position. Wind is often different from one location to the next, and the projectile may pass through several different wind conditions along its path. If the wind at the shooter is 3 mph left to right, but it switches to 10 mph right to left 100 yards downrange, a left hold calculated at the shooter's position will result in a miss. Military snipers claim that an accurate analysis of wind is the last variable to be conquered using technology suitable for military field use. Other variables such as the Coriolis effect, changes in temperature, barometric pressure, and altitude can be measured with appropriate handheld instruments.

Determining the effects of wind on the landing and takeoff of an aircraft is critical to the safety of the airplane. Even though major airports have the ability to measure wind sheers with complex instrumentation, to date a technology has not been developed to be incorporated into a handheld unit for scientific and Navy operations. Current technology cost upwards of $500,000 for this protection, as a result most small airports do not have any protection.

Thus there exists a need for a line of sight wind detection system that can determine the effects of the wind along the complete path the projectile will travel as well as the landing and taking off of aircraft.

BRIEF SUMMARY OF INVENTION

A line of sight wind detection system that overcomes these and other problems has a laser with an output that is directed at a target. The system also has a receiver with a Hartmann aperture array receiving a reflected beam impinging on the Hartmann aperture array. A multiple pixel sensor senses a number of spots of light from the Hartmann aperture array. An analyzer receives an output from the multiple pixel sensor and determines an effective wind speed along a line of sight using the position of the spots. The system takes advantage of the fact that the wind along the line of sight will result in a shift in the angle of the wave front of the reflected beam. This shift in the angle of the wavefront contains all the information of the cumulative effect on a projectile fired at the target. This is called the effective wind speed. As a result, the operator has the information necessary to correct for the wind along the projectiles path to the target.

This technology can also be used to determine the effects of wind speed on an aircraft. This particularly useful for determining wind sheer at airports that cannot afford the present technology used to detect wind sheer. This technology can also be used to spot prop wash also known as spiral slipstream and other hazardous turbulence. In this case, the target is the air itself. By proper selection of the laser, the device can receive a reflection from the air.

DETAILED DESCRIPTION OF THE INVENTION

The invention is direct to a line of sight wind detection system that has a laser with an output that is directed at a target. The system also has a receiver with a Hartmann aperture array receiving a reflected beam impinging on the Hartmann aperture array. A multiple pixel sensor senses a number of spots of light from the Hartmann aperture array. An analyzer receives an output from the multiple pixel sensor and determines an effective wind speed along a line of sight using a position of the spots. The system takes advantage of the fact that the wind along the line of sight will result in a shift the angle of the wave front of the reflected beam. This shift in the angle of the wavefront contains all the information of the cumulative effect on a projectile fired at the target. This is called the effective wind speed. As a result, the operator has the information necessary to correct for the wind along the projectiles path to the target.

This technology can also be used to determine the effects of wind speed on an aircraft. This particularly useful for determining wind sheer at airports that cannot afford the present technology used to detect wind sheer. This technology can also be used to spot prop wash also known as spiral slipstream and other hazardous turbulence. In this case, the target is the air itself. By proper selection of the laser, the device can receive a reflection from the air.

Figure 1:
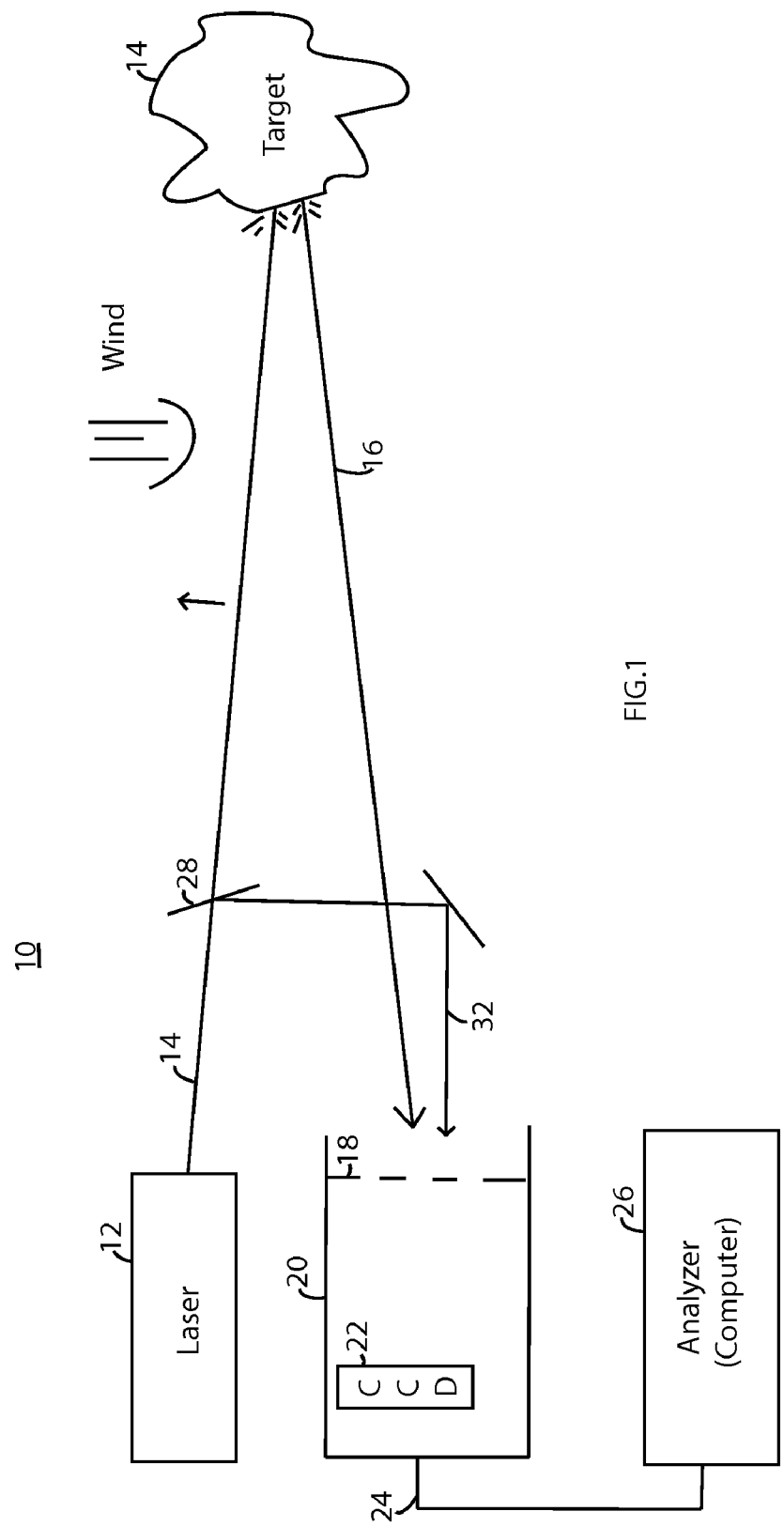
FIG. 1 is a block diagram of a line of sight wind detection system in accordance with one embodiment of the invention.

FIG. 1 is a block diagram of a line of sight wind detection system 10 in accordance with one embodiment of the invention. The system 10 has a laser 12 or other light source. The output 14 of the laser 12 is directed at a target 14. A reflected light beam 16 impinges on a Hartmann aperture 18. The Hartman aperture 18 is part of a Hartmann camera 20. The Hartman aperture 18 has a number of small apertures that produce dots of light on a multiple pixel sensor, such as a CCD (Charged Coupled Device) 22. The output 24 of the CCD 22 is coupled to an analyzer 26. The analyzer 26 may be a general purpose computer running software designed to determine the effective wind speed and the range to target. The wave front of the laser light is shifted at an angle to the aperture array as a result of the net effects of the wind on the round trip of the light. This angular shift in the wave front causes the light through the aperture array to shift in position on the CCD detector array. The average shift of these dots of light through the aperture array is correlated to an effective wind speed. The effective wind speed is the cumulative effect on a projectile fired at the target. The range may be determined by pulsing the laser and determining round trip travel time or using other well known techniques, such as a phase tracking.

In one embodiment, the system 10 has a beam splitter 28 and mirror 30 that create a reference optical path and reference beam of light. The reference beam 32 is used to determine the effects of vibration on the camera 20 and for alignment of the laser with the receiver. The movement of the reference beam's dots on the CCD 22 are due to vibration of the camera and can be subtracted as a bias having nothing to do with the wind's effect on the light beam 16. In another embodiment, a separate laser is used to create a reference beam for auto adjusting to center the beam of light.

The analyzer 26 has an algorithm (Zernike coefficients) for determining the effects of mirage. Once the mirage effects are characterized the image can be digitally adjusted to negate the effects of mirage.

Note that this system 10 is wavelength independent and does not use Doppler shift to determine the effective wind speed. This technology can also be used to determine the effects of wind speed on an aircraft. This particularly useful for determining wind sheer at airports that cannot afford the present technology used to detect wind sheer. This technology can also be used to spot prop wash also known as spiral slipstream and other hazardous turbulence.

Figure 2:
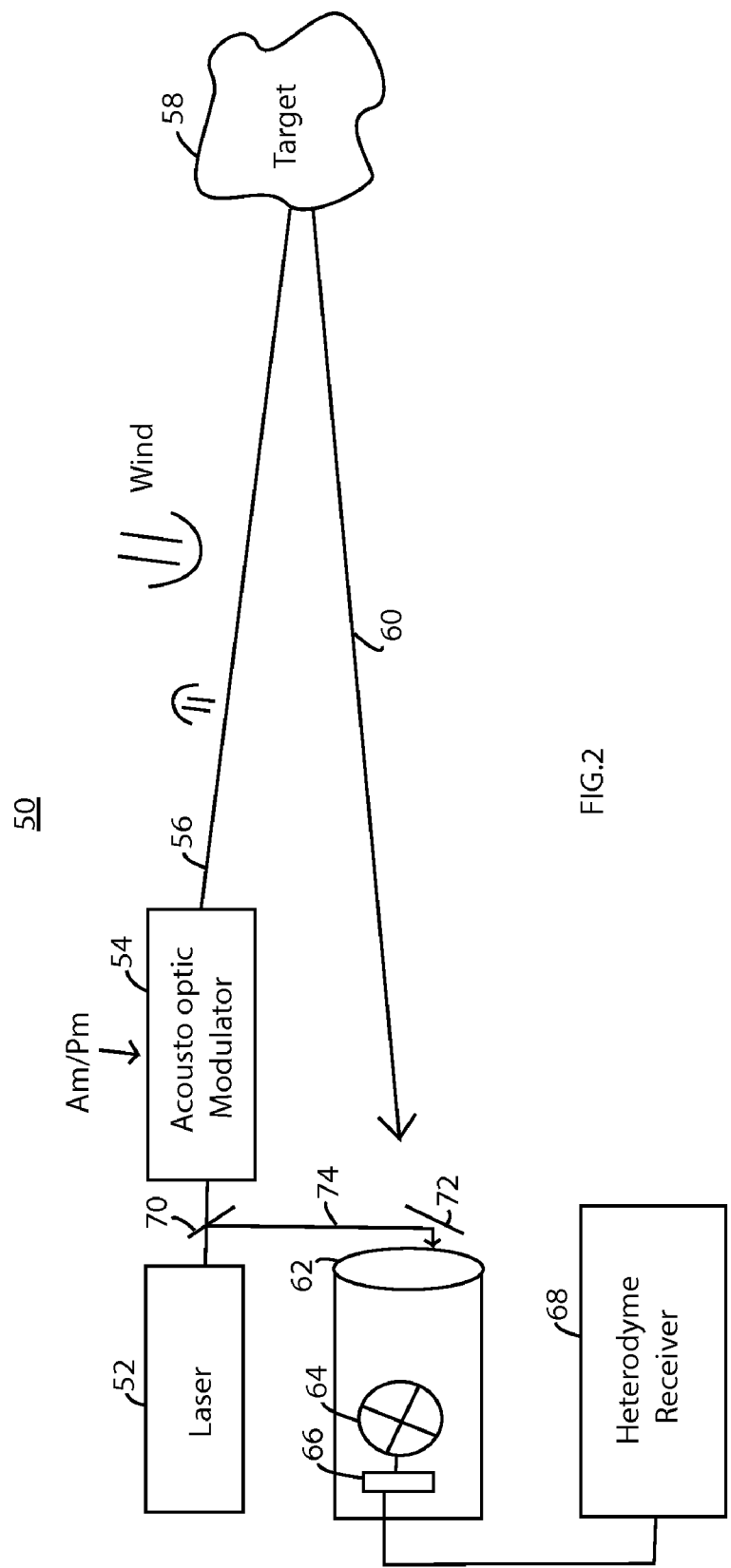
FIG. 2 is a block diagram of a line of sight wind detection system in accordance with one embodiment of the invention.

FIG. 2 is a block diagram of a line of sight wind detection system 50 in accordance with one embodiment of the invention. The system 50 has a laser 52 with an output coupled to an acousto-optic modulator 54. The acousto-optic modulator can place an AM (amplitude modulation) or FM (frequency modulation) on the light to form a modulated light beam 56. The light beam 56 is directed at a target 58. A return beam 60 is focused by a lens 62. The focused light is detected by a quadrant detector 64. Electronics 66 process the outputs from the quadrant detector 64. A receiver 68 receives the processed output from the electronics 66. The receiver 68 may includes a heterodyne receiver circuit for detecting the AM or FM modulation on the light 56. The AM or FM modulation in combination with the heterodyne receiver circuit increases the sensitivity of the system and can also be used in determining range.

In one embodiment, a beam splitter 70 reflects a small portion of the output light from the laser 52. A mirror 72 reflects the reference beam 74 into the lens 62. The reference beam 74 is used to calibrate the system 50 to make sure the optical axis of the laser and the lens 62 and detector 64 are aligned.

In operation, the wave front of the laser light is shifted at an angle to the lens as a result of the net effects of the wind on the round trip of the light. This angular shift in the wave front causes the light through the lens to shift in position on the quadrant detector. The shift in position is correlated to an effective wind speed. The range may be determined by pulsing the laser and determining round trip travel time or using other well known techniques, such as a phase tracking.

The effective wind speed and range can be displayed on a computer monitor or other output device.

Thus there has been described a line of sight wind detection system that can determine the effects of the wind along the complete path the projectile will travel. This technology can also be used to determine the effects of wind speed on an aircraft. In this case, the target is the air itself. By proper selection of the laser, the device can receive a reflection from the air.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A line of sight wind speed detector, comprising:
    a laser having an output that is directed at a target;
    a receiver comprising:
        a Hartmann aperture array with a reflected beam impinging on the Hartmann aperture array,
        a multiple pixel sensor receiving a plurality of spots of light from the Hartmann aperture array, and
    an analyzer receiving an output from the multiple pixel sensor and determining an effective wind speed along a line of sight using a position of the plurality of spots.

2. The detector of claim 1, wherein the analyzer measures a round trip time of the output of the laser and determines a range to the target.

3. The detector of claim 2, wherein the analyzer adjusts the effective wide speed for a mirage effect.

4. The detector of claim 1, further including a reference optical path directing a reference beam of light onto the Hartmann aperture array.

5. The detector of claim 4, wherein the analyzer determines a vibration of the receiver.

6. The detector of claim 1, wherein the multiple pixel sensor is a charge coupled device.

* * * * *